(12) United States Patent
Niina et al.

(10) Patent No.: US 11,190,839 B2
(45) Date of Patent: Nov. 30, 2021

(54) COMMUNICATION QUALITY ADJUSTING SYSTEM

(71) Applicants: NTT DOCOMO, INC., Chiyoda-ku (JP); INISOFT Co., Ltd., Seongnam-si (KR)

(72) Inventors: Tatsuro Niina, Chiyoda-ku (JP); Eiko Oonuki, Chiyoda-ku (JP); Ema Tooriyama, Chiyoda-ku (JP); Yunsang Oh, Chiyoda-ku (JP); TaeHyun Kim, Seongnam-si (KR); Joonsang Lee, Seongnam-si (KR)

(73) Assignees: NTT DOCOMO, INC., Chiyoda-ku (JP); INISOFT Co., Ltd., Seongnam-si (KR)

( * ) Notice: Subject to any disclaimer, the term of this patent is extended or adjusted under 35 U.S.C. 154(b) by 0 days.

(21) Appl. No.: 16/648,024

(22) PCT Filed: Sep. 14, 2018

(86) PCT No.: PCT/JP2018/034284
§ 371 (c)(1),
(2) Date: Mar. 17, 2020

(87) PCT Pub. No.: WO2019/059134
PCT Pub. Date: Mar. 28, 2019

(65) Prior Publication Data
US 2020/0280766 A1    Sep. 3, 2020

(30) Foreign Application Priority Data
Sep. 22, 2017   (JP) .............................. JP2017-182755

(51) Int. Cl.
*H04N 21/6547* (2011.01)
*H04N 21/45* (2011.01)
(Continued)

(52) U.S. Cl.
CPC ....... *H04N 21/4524* (2013.01); *H04N 21/442* (2013.01); *H04N 21/4662* (2013.01); *H04N 21/4784* (2013.01); *H04N 21/6547* (2013.01)

(58) Field of Classification Search
None
See application file for complete search history.

(56) References Cited

U.S. PATENT DOCUMENTS 8,949,874 B1 *  2/2015  Li ...................... H04N 21/4828
                                                        725/14
9,497,243 B1 * 11/2016  Binns ................... H04L 65/4084
(Continued)

FOREIGN PATENT DOCUMENTS

| EP | 2 924 999 A1 | 9/2015 |
| JP | 2010-81103 A | 4/2010 |
| WO | WO 2008/108379 A1 | 9/2008 |

OTHER PUBLICATIONS

Extended European Search Report dated Jun. 15, 2020 in Patent Application No. 18859448.5, 10 pages.
(Continued)

*Primary Examiner* — William J Kim
(74) *Attorney, Agent, or Firm* — Oblon, McClelland, Maier & Neustadt, L.L.P.

(57) ABSTRACT

A communication quality adjusting system includes: an environment information acquiring unit that acquires environment information representing an environment, in which a receiver is placed, and having an effect on a communication state of the receiver; a criterion determining unit that determines a criterion associating a communication state of the receiver and a reception form used when the receiver receives content in accordance with the environment information acquired by the environment information acquiring unit; and a distribution unit that performs control such that the receiver receives video content in the reception form (Continued)

corresponding to the communication state of the receiver on the basis of the criterion determined by the criterion determining unit.

5 Claims, 5 Drawing Sheets

(51) Int. Cl.
*H04N 21/442* (2011.01)
*H04N 21/466* (2011.01)
*H04N 21/4784* (2011.01)

(56) References Cited

U.S. PATENT DOCUMENTS

| | | | | |
|---|---|---|---|---|
| 2012/0311043 | A1* | 12/2012 | Chen | H04N 21/23406 709/204 |
| 2012/0331106 | A1* | 12/2012 | Ramamurthy | H04N 21/6587 709/218 |
| 2013/0326024 | A1* | 12/2013 | Chen | H04L 65/4084 709/219 |
| 2015/0025663 | A1* | 1/2015 | Cameron | H04L 65/60 700/94 |
| 2015/0106312 | A1* | 4/2015 | Chen | H04W 4/18 706/21 |
| 2015/0208120 | A1* | 7/2015 | Yao | H04N 21/6543 725/9 |
| 2015/0281299 | A1 | 10/2015 | Moustafa et al. | |
| 2016/0142745 | A1* | 5/2016 | Fisher | H04N 21/2187 725/62 |
| 2018/0070273 | A1* | 3/2018 | Sleight | H04W 36/023 |
| 2018/0184146 | A1* | 6/2018 | Pichon | H04N 21/6125 |
| 2018/0213296 | A1* | 7/2018 | Kellar | H04N 21/6338 |
| 2019/0208001 | A1* | 7/2019 | Stumbo | H04N 21/6373 |

OTHER PUBLICATIONS

Yusuf Sani, et al., "Adaptive Bitrate Selection: A Survey" IEEE Communications Surveys & Tutorials, vol. 19, No. 4, XP055543348, Jul. 12, 2017, pp. 2985-3014.
Maxim Claeys, et al., "Design and Evaluation of a Self-Learning HTTP Adaptive Video Streaming Client" IEEE Communications Letters, vol. 18, No. 4, XP011545402, Apr. 1, 2014, pp. 716-719.
International Preliminary Report on Patentability and Written Opinion dated Apr. 2, 2020 in PCT/JP2018/034284 (submitting English translation only), 7 pages.
International Search Report dated Nov. 27, 2018 in PCT/JP2018/034284 filed on Sep. 14, 2018, 1 page.
Mao, H. et al., "Neural Adaptive Video Streaming with Pensieve," SIGCOMM '17 Proceedings of the Conference of the ACM Special Interest Group on Data Communication, ACM, Aug. 2017, pp. 197-210.
European Office Action dated Mar. 23, 2021 in European Patent Application No. 18859448.5, 5 pages.
Office Action dated May 4, 2021 in Korean Application No. 10-2020-7010723 (w/English translation).
Office Action dated Aug. 24, 2021 in Japanese Application No. 2019-543620 (w/English translation).

\* cited by examiner

COMMUNICATION QUALITY ADJUSTING SYSTEM

TECHNICAL FIELD

The present invention relates to a communication quality adjusting system.

BACKGROUND ART

In Patent Literature 1, a technology for adjusting a distribution speed of content distributed to a terminal is disclosed. In this technology, a plurality of areas divided in accordance with a communication environment state of a mobile terminal are generated inside a content distribution zone. Then, an area to which a mobile terminal that is a content distribution destination belongs among the generated areas is identified on the basis of position information of the terminal that becomes a distribution destination. In accordance with a communication environment state corresponding to the identified area, the speed of content distribution to a content distribution destination is adjusted.

CITATION LIST

Patent Literature

[Patent Literature 1] Japanese Unexamined Patent Publication No. 2010-81103

SUMMARY OF INVENTION

Technical Problem

As in a conventional technology, in a case in which a distribution speed of content is adjusted in correspondence with an area, it is difficult to adjust the distribution speed of content in correspondence with a communication state for each user belonging to the same area. For this reason, in a case in which video content is distributed through streaming or the like, there is concern of stopping of reproduction, generation of a block noise, and the like occurring.

An object of one aspect of the present invention is to provide a communication quality adjusting system capable of inhibiting stopping of reproduction, generation of a block noise, and the like and causing content to be received with stable quality in a receiver.

Solution to Problem

According to one aspect of the present invention, there is provided a communication quality adjusting system including: an acquisition unit configure to acquire environment information representing an environment, in which a receiver is placed, and having an effect on a communication state of the receiver; a criterion determining unit configure to deter mine a criterion associating a communication state of the receiver and a reception form used when the receiver receives content in accordance with the environment information acquired by the acquisition unit; and a control unit configure to perform control such that the receiver receives video content in the reception form corresponding to the communication state of the receiver on the basis of the criterion determined by the criterion determining unit.

In this communication quality adjusting system, a criterion associating a communication state of the receiver and a reception form of the receiver is determined in accordance with environment information, and content can be received by the receiver in a reception form corresponding to the communication state. Since the criterion is determined in accordance with environment information, the receiver can receive video content in a reception form that differs in accordance with an environment even in the same communication state.

Accordingly, stopping of reproduction, generation of a block noise, and the like are inhibited, and video content can be received with stable quality by the receiver.

Advantageous Effects of Invention

According to one embodiment of the present invention, a communication quality adjusting system capable of suppressing stopping of reproduction, generation of a block noise, and the like and causing content to be received with stable quality in a receiver can be provided.

DESCRIPTION OF EMBODIMENTS

Hereinafter, embodiments of the present invention will be described more specifically with reference to the drawings. For the convenience of description, the same reference signs will be assigned to elements that are substantially the same, and description thereof may be omitted.

First Embodiment

Figure 1:
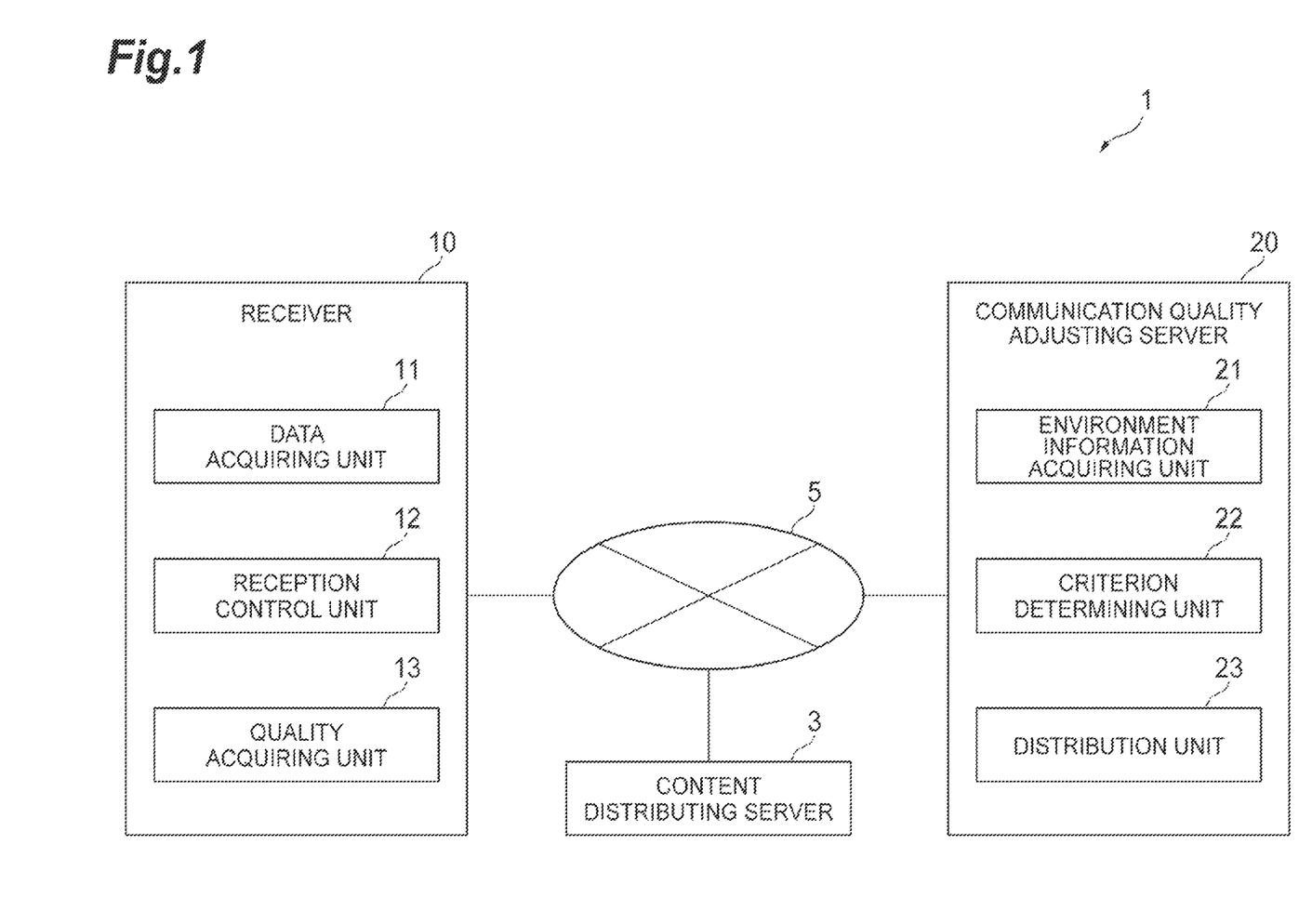
FIG. 1 is a conceptual diagram illustrating a content distributing system including a communication quality adjusting system according to one embodiment.

FIG. 1 is a conceptual diagram illustrating a content distributing system including a communication quality adjusting system according to one embodiment. The content distributing system 1 includes a content distributing server 3, a receiver 10, and a communication quality adjusting server (a communication quality adjusting system) 20. The content distributing server 3, the receiver 10, and the communication quality adjusting server 20 are configured to be able to perform data communication with each other through a network 5. In addition, although the content distributing server 3 and the communication quality adjusting server 20 are illustrated as mutually different devices in the example illustrated in the drawing, the content distributing server 3 and the communication quality adjusting server 20 may be configured as the same device.

The content distributing server 3 is an information processing terminal such as a server computer and is a server that distributes video content through streaming. The content distributing server 3 is composed of hardware such as a CPU, a memory, a communication module, and the like. The content distributing server 3, for example, is managed by a company providing a video viewing service through the Internet. A user using the receiver 10, for example, can view video content on the receiver 10 by having a usage contract for a video viewing service with such a company.

The content distributing server 3 stores a plurality of pieces of video data encoded in correspondence with different image qualities. For example, the content distributing server 3 stores a plurality of pieces of video content and includes high-quality video data, intermediate-quality video data, and low-quality video data for each piece of video content. The high-quality video data is encoded at a high bit rate. The intermediate-quality video data is encoded at a bit rate lower than that of the high-quality video data. The low-quality video data is encoded at a bit rate that is even lower than that of the inter mediate-quality video data. The content distributing server 3 distributes video data corresponding to a bit rate requested from the receiver 10 to the receiver 10.

The receiver 10 is a terminal device that can receive video data distributed from the content distributing server 3. For example, the receiver 10 may be a smartphone, a cellular phone, a tablet terminal, a personal digital assistant (PDA), a personal computer, a television set, a set-top box, or the like. In this embodiment, the receiver 10 is a device that is carried and used by a user and has a function of performing radio communication by being connected to the network 5 such as a mobile communication network or the like. The receiver 10 is composed of hardware such as a central processing unit (CPU), a memory, a communication module, a display, a speaker, and the like. Although only one receiver 10 is illustrated in FIG. 1, a plurality of receivers 10 can be simultaneously connected to the network 5.

The receiver 10 includes a data acquiring unit 11, a reception control unit 12, and a quality acquiring unit 13. The data acquiring unit 11 can acquire data representing an environment in which the receiver 10 is placed using various sensors and the like included in the receiver 10. In the data acquired by the data acquiring unit 11, position information, acceleration information, and the like of the receiver 10 are included. The position information may be information representing latitude and longitude according to the Global Positioning System (GPS). In addition, the position information may be location registration information based on information of a base station of an area in which the receiver 10 is present, Wi-Fi position information based on a signal from an access point of Wi-Fi (a registered trademark) acquired by the receiver 10, or the like. The acceleration information can be acquired using an acceleration sensor disposed in the receiver.

In addition, the data acquiring unit 11 can acquire communication environment information representing a communication environment in which the receiver 10 is placed. The communication environment information represents a communication level of the receiver 10 in the network 5 to which the receiver 10 is connected and, for example, may be a network speed set for each receiver 10 in a case in which a network speed is set in a plurality of communication levels in accordance with a radio wave intensity from a base station or the like. In addition, the data acquiring unit 11 acquires communication speed information representing an actual communication speed when the receiver 10 receives data through the network 5 separately from the communication environment information.

The data acquiring unit 11 can also acquire time information representing a time when each piece of data is acquired as a part of the data of a sensor. The data acquiring unit 11 may regularly detect data of a sensor. The data acquiring unit 11 can transmit the position information, the acceleration information, the time information, the communication environment information, and the communication speed information of the receiver 10 that have been detected to the communication quality adjusting server 20 as environment information. In addition, the data acquiring unit 11 may accumulate each piece of data that has been acquired over a predetermined period.

The reception control unit 12 controls parameters relating to a data reception form used when video content is received. For example, the reception control unit 12 stores parameters such as a buffer size, a bit rate, and the like that are used when the receiver 10 receives video content. In a case in which a user views video content using the receiver 10, the reception control unit 12 transmits a distribution request including identification information of a user, identification information of content, a parameter relating to a reception form, and the like to the content distributing server 3. In addition, when video data is received from the content distributing server 3, the reception control unit 12 controls a video reproduction process based on the parameter of the reception form. For the control of the video reproduction process, a known control method can be used.

The quality acquiring unit 13 acquires actual reproduction quality when video content of the content distributing server 3 is reproduced by the receiver 10. The reproduction quality, for example, may be data relating to the amount of remaining data inside a buffer, presence/absence of video interruption, a degree of video interruption (the number of interruptions and the duration), presence/absence of a block noise, and the like. For example, the quality acquiring unit 13 may directly store each piece of data representing reproduction quality or may convert each piece of data representing reproduction quality into a numerical value corresponding to the quality and store the converted numerical value. The quality acquiring unit 13 transmits the acquired data relating to the reproduction quality to the communication quality adjusting server 20.

The communication quality adjusting server 20 is an information processing terminal such as a server computer or the like and transmits information of a reception form in which optimal reproduction quality can be acquired to the receiver 10. Here, "optimal" does not refer to that which is most appropriate in an absolute sense, but that which is most appropriate under a predetermined condition. The communication quality adjusting server 20 is composed of hardware such as a CPU, a memory, a communication module, and the like.

The communication quality adjusting server 20 includes an environment information acquiring unit 21, a criterion determining unit 22, and a distribution unit (control unit) 23. The environment information acquiring unit 21 acquires environment information that is environment information representing an environment in which the receiver 10 is placed and has an effect on a communication state of the receiver 10. The environment information includes position information representing the position of the receiver 10 and time information representing a time at which the receiver 10 performs communication. In this embodiment, the environment information acquiring unit 21 acquires the position information, the acceleration information, the time information, and the communication environment information (a network speed) transmitted from the data acquiring unit of the receiver 10 to the communication quality adjusting server 20. In addition, the environment information acquiring unit 21 acquires the data relating to reproduction quality transmitted from the quality acquiring unit 13. The environment information acquiring unit 21 may accumulate each piece of data that has been acquired over a predetermined period.

The criterion determining unit 22 determines (generates) a criterion associating the communication state of the receiver 10 with the reception form used when the receiver 10 receives video content in accordance with the environment information acquired by the environment information acquiring unit 21. The communication state is communication quality when the receiver 10 is receiving video content and, for example, may be a communication speed. In addition, the reception form is a reception condition set when the receiver 10 receives video content and may be parameters such as a buffer size, a bit rate, and the like. The criterion associating a communication state and a reception form with each other may be a pattern of a combination of the communication state and the reception form.

An algorithm for acquiring a combination of a communication state and a reception form for which optimal reproduction quality can be acquired for environment information as an input has been derived through machine learning in the criterion determining unit 22. For example, in a case in which environment information representing that the movement speed of the receiver 10 is high is acquired, it is assumed that the communication state of the receiver 10 may easily vary. In such a case, even when the communication state of the receiver 10 corresponds to the reception of a high bit rate, there are cases in which the receiver 10 cannot respond to the reception of a high bit rate in accordance with degradation of the communication state occurring thereafter. Thus, in a case in which the movement speed of the receiver 10 is high, the criterion determining unit 22, for example, can generate a combination of a communication state representing a high communication speed and a reception form representing a low bit rate as a criterion. In addition, the criterion determining unit 22 may generate a combination of a communication state representing a high communication speed and a reception form representing a large buffer size as a criterion. For example, the criterion determining unit 22 generates a combination of a communication state representing a high communication speed (equal to or higher than 2 Mbps) and a reception form representing a bit rate (700 Kbps) of intermediate image quality, a combination of a communication state representing an intermediate communication speed (equal to or higher than 1 Mbps and lower than 2 Mbps) and a reception form representing a bit rate (350 Kbps) of low image quality, and a combination of a communication state representing a low communication speed (lower than 1 Mbps) and a reception form representing a bit rate (350 Kbps) of low image quality and a large buffer size as criteria.

On the other hand, in a case in which environment information representing that there is no movement of the position of the receiver 10, and the network 5 is not congested is acquired, it is assumed that the communication state of the receiver 10 is stable. In this case, it is assumed that, in a case in which the communication state of the receiver 10 corresponds to the reception of a high bit rate, it will continue to correspond to the reception of a high bit rate also after that. Thus, as one example, the criterion determining unit 22 generates a combination of a communication state representing a high communication speed (equal to or higher than 2 Mbps) and a reception form representing a bit rate (1.5 Mbps) of high image quality, a combination of a communication state representing an intermediate communication speed (equal to or higher than 1 Mbps and lower than 2 Mbps) and a reception form representing a bit rate (700 Kbps) of intermediate image quality, and a combination of a communication state representing a low communication speed (lower than 1 Mbps) and a reception form representing a bit rate (350 Kbps) of low image quality as criteria.

In addition, in a case in which a time zone in which the network 5 is congested is known in advance, the criteria may be switched in accordance with a time zone. For example, in a time zone (for example, in the morning) in which the network 5 is congested, further congestion of the network 5 may be inhibited by not selecting a high bit rate even for a high communication speed. As one example, the criterion determining unit 22 may generate a combination of a communication state representing a high communication speed (equal to or higher than 2 Mbps) and a reception form representing a bit rate (700 Kbps) of intermediate image quality, a combination of a communication state representing an intermediate communication speed (equal to or higher than 1 Mbps and lower than 2 Mbps) and a reception form representing a bit rate (700 Kbps) of intermediate image quality, and a combination of a communication state representing a low communication speed (lower than 1 Mbps) and a reception form representing a bit rate (350 Kbps) of low image quality as criteria. On the other hand, in a time zone (for example, at night) in which the network 5 is not congested, by selecting a high bit rate at the time of a high communication speed, a degree of user's satisfaction may be improved. As one example, the criterion determining unit 22 may generate a combination of a communication state representing a high communication speed (equal to or higher than 2 Mbps) and a reception form representing a hit rate (1.5 Mbps) of high image quality, a combination of a communication state representing an intermediate communication speed (equal to or higher than 1 Mbps and lower than 2 Mbps) and a reception form representing a bit rate (700 Kbps) of intermediate image quality, and a combination of a communication state representing a low communication speed (lower than 1 Mbps) and a reception form representing a bit rate (350 Kbps) of low image quality as criteria.

In addition, the criterion determining unit 22 improves the accuracy of the algorithm for generating criteria such that the criteria each associating a communication state of the receiver 10 and a reception form of the receiver 10 are optimized. For example, the criterion determining unit 22 may improve the accuracy of the algorithm using a technology of machine learning (reinforcement learning). In other words, the criterion determining unit 22 outputs a combination of a communication state and a reception form in accordance with acquired environment information and acquires actual reproduction quality in the receiver 10. The criterion determining unit 22 strengthens the algorithm for acquiring an optimal combination of a communication state corresponding to the environment information and a reception form such that a reward is maximized when the reproduction quality is set as the reward.

The distribution unit 23 distributes information including a reception form to the receiver 10 on the basis of the criteria determined by the criterion determining unit 22 such that the receiver 10 receives video content in the reception form corresponding to the communication state of the receiver 10. In this embodiment, the distribution unit 23 distributes parameters (a buffer size and a bit rate) of the reception form corresponding to the communication state of the receiver 10 to the receiver 10 by referring to the criteria determined by the criterion determining unit 22. In the receiver 10, the parameters of the distributed reception form are stored in the reception control unit 12.

Next, operations of the communication quality adjusting server 20, the receiver 10, and the content distributing server 3 will be described by referring to sequences illustrated in FIGS. 2 and 3.

Figure 2:
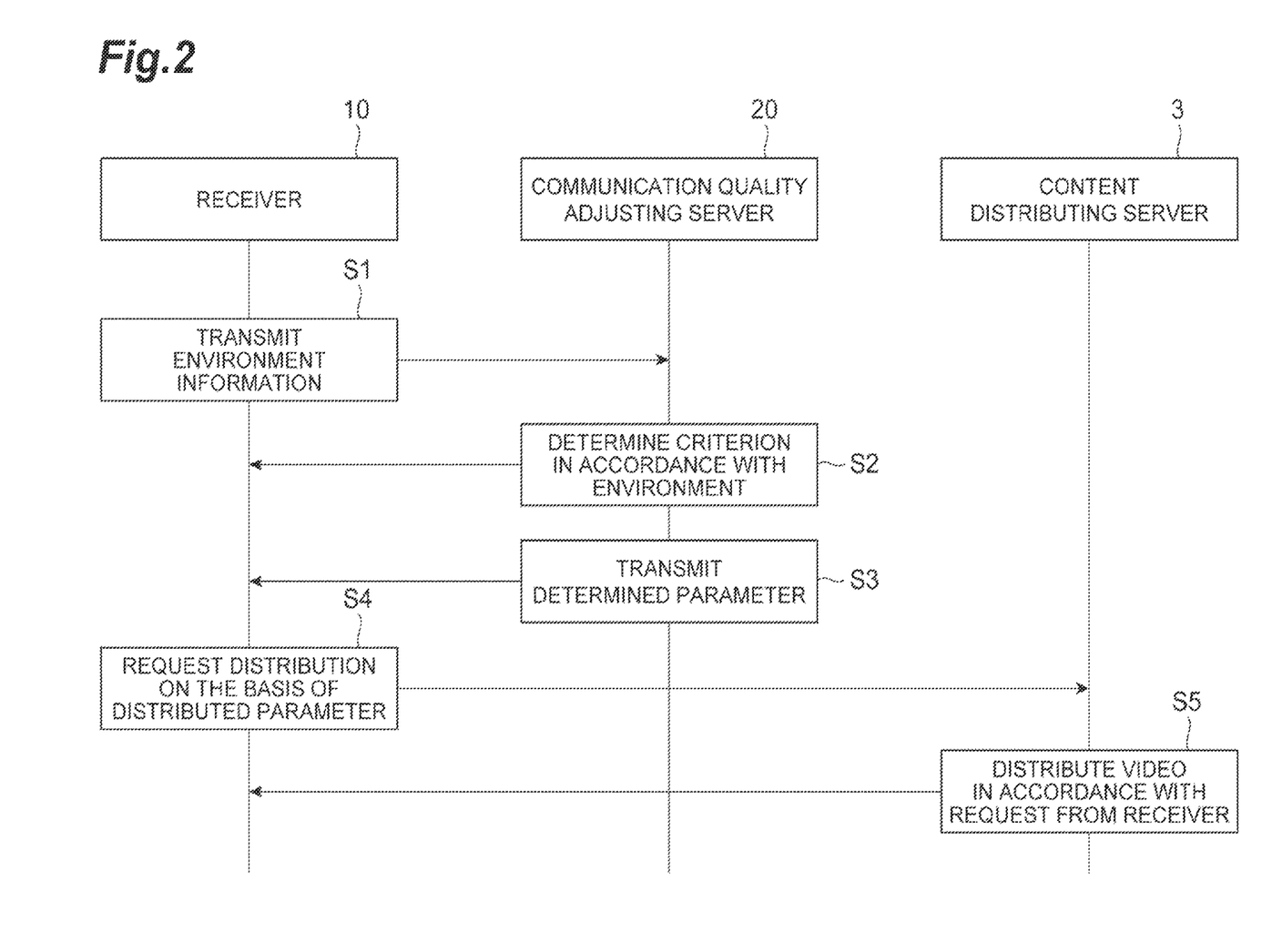
FIG. 2 is a diagram illustrating a sequence when video content is distributed.

FIG. 2 illustrates a sequence when video content is distributed from the content distributing server 3 to the receiver 10. In a case in which a user wishes to view video content using the receiver 10, first, environment information is transmitted from the receiver 10 to the communication quality adjusting server 20 (Step S1). For example, this transmission may be triggered by access of the content distributing server 3 by the receiver 10. In addition, in this embodiment, the receiver 10 transmits a current communication state of the receiver 10 to the communication quality adjusting server 20 in addition to the environment information.

The communication quality adjusting server 20 that has received the environment information and the communication state from the receiver 10 determines a criterion associating the communication state of the receiver 10 with a reception form used when the receiver 10 receives content in accordance with the environment information (Step S2). The distribution unit 23 determines parameters (a bit rate and a buffer size) of the reception form that is optimal for the communication state by referring to the criterion. The determined parameters are transmitted to the receiver 10 by the distribution unit 23 (Step S3).

In the receiver 10 that has received the parameters of the reception form, parameters stored in the reception control unit 12 are updated with the newly received parameters. The reception control unit 12 transmits a distribution request for video content to the content distributing server 3 on the basis of the updated parameters (Step S4). For example, this transmission may be triggered by a user's operation on the receiver 10.

The content distributing server 3 that has received a distribution request from the receiver 10 distributes video data having image quality corresponding to a parameter (a bit rate) included in the distribution request to the receiver 10 (Step S5). In this way, video content can be viewed using the receiver 10.

The transmission of environment information and a communication state in Step S1 and the determination and transmission of parameters of a reception form in Steps S2 and S3 may be regularly executed (for example, every second) continuously also after the start of distribution of video content. In accordance with this process, in a case in which parameters stored by the reception control unit 12 are updated, the updated parameters are transmitted to the content distributing server 3.

Figure 3:
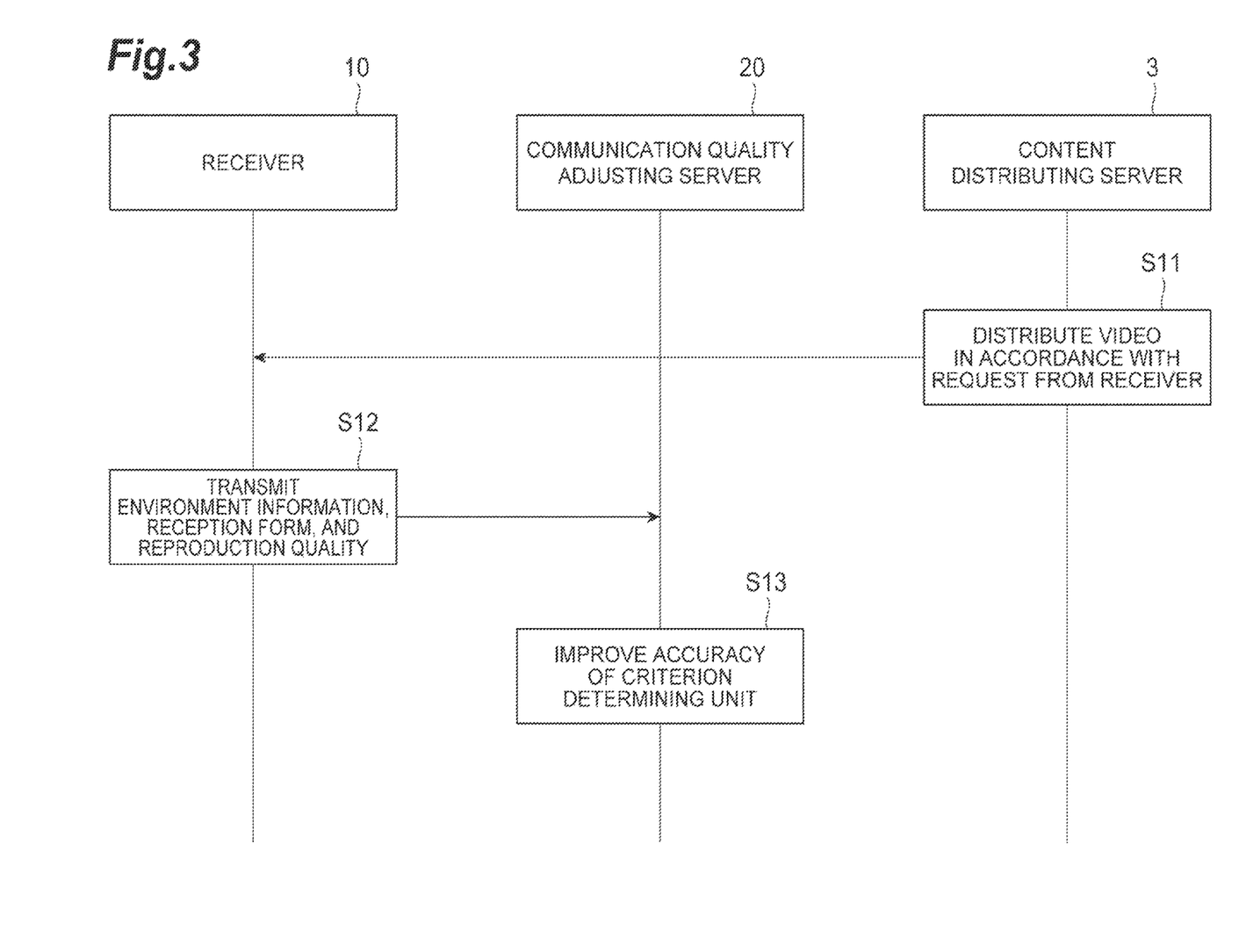
FIG. 3 is a diagram illustrating a sequence for improving accuracy of an algorithm in a criterion determining unit.

FIG. 3 illustrates a sequence for improving accuracy of an algorithm in the criterion determining unit 22 of the communication quality adjusting server 20. For example, the improvement of accuracy of the algorithm in the criterion determining unit 22 may be executed during the distribution of video content illustrated in FIG. 2. In addition, the improvement of accuracy of the algorithm in the criterion determining unit 22 may be executed when a predetermined amount of data transmitted from a plurality of receivers 10 is accumulated in the communication quality adjusting server 20.

As described above, in accordance with transmission of a distribution request from the receiver 10, video content is distributed from the content distributing server 3 to the receiver 10 (Step S11). At this time, environment information, a reception form, information representing an actual communication state, and information representing actual reproduction quality are regularly (for example, every second) transmitted from the receiver 10 to the communication quality adjusting server 20 (Step S1). The criterion determining unit 22 of the communication quality adjusting server 20 derives an algorithm for acquiring an optimal combination of a communication state and a reception form for the environment information on the basis of a known technology of machine learning with the environment information, the reception form, the information representing an actual communication state and the information representing actual reproduction quality as inputs and updates the algorithm (Step S13).

In the communication quality adjusting server 20 described above, a criterion associating a communication state of the receiver 10 and a reception form of the receiver 10 with each other is determined in accordance with environment information. In accordance with distribution of information including a reception form from the distribution unit 23 to the receiver 10, the receiver 10 can receive video content in the reception form corresponding to the communication state. Since a different criterion can be generated in accordance with the acquired environment information, the receiver 10 can receive video content in a reception form that differs in accordance with an environment even in a similar communication state. Accordingly, stopping of reproduction, generation of a block noise, and the like are inhibited, and the receiver 10 can receive video content with stable quality.

The environment information includes position information and time information of the receiver 10. Here, as a characteristic of a network for a mobile body, there is a difference in a time zone in which the network is congested in accordance with a position. In this embodiment, by including the position information and the time information in the environment information, a characteristic of a congested status for each position can be reflected on the criterion associating a communication state and a reception form. In addition, the environment information includes acceleration information of the receiver 10 as a state of the receiver 10. A speed of the receiver 10 can be estimated using the acceleration information. In other words, speed information of the receiver 10 is acquired on the basis of the acquired acceleration information by the criterion determining unit 22. In this case, a criterion associating a communication state and a reception form with each other can be generated in accordance with not only a network state but also a change in the state of the receiver 10.

When reproduction quality of content received by the receiver 10 is set as a reward, the criterion determining unit 22 performs machine learning of a combination of a communication state corresponding to environment information and a reception form such that the reward is maximized. In this way, changes in the communication environment that are difficult to predict can be responded in a flexible manner. In the embodiment, although the position information, the acceleration information, the time information, the communication environment information, the communication speed information, and the like have been described as the environment information, information other than these may be included in the environment information.

Second Embodiment

In a content distributing system according to this embodiment, determination of parameters of a reception form is executed by a receiver, which is different from the content distributing system according to the first embodiment. Hereinafter, points different from those of the first embodiment will be described, the same reference signs will be assigned to the same elements, and detailed description will be omitted.

Similar to the first embodiment, the content distributing system according to this embodiment includes a content distributing server 3, a receiver 10, and a communication quality adjusting server 20 (see FIG. 1). A criterion determining unit 22 of the communication quality adjusting server 20 determines a criterion associating a communication state of the receiver 10 with a reception form used when the receiver 10 receives video content in accordance with environment information acquired by an environment information acquiring unit 21. In this embodiment, the environment information is patterned, and a criterion associating a communication state and a reception form is determined for each pattern. In other words, a plurality of criteria corresponding to mutually different pieces of environment information are determined.

For example, in a case in which a communication environment on a road along a certain route (hereinafter, referred to as an A route road) is similar from 6 o'clock to 10 o'clock on weekdays, the criterion determining unit 22 stores environment information regarding 6 o'clock to 10 o'clock on weekdays of the A route road as one pattern in advance and determines a criterion associating a communication state and a reception form that are optimal to this pattern. Similarly, in a case in which a communication environment on the A route road is similar from 18 o'clock to 23 o'clock on weekdays, the criterion determining unit 22 stores environment information regarding 18 o'clock to 23 o'clock on weekdays of the A route road as another pattern and determines a criterion associating a communication state and a reception form that are optimal to this pattern.

On the A route road, a trend, in which the network is congested to cause the communication state of the receiver 10 to be easily changeable in the time zone of 6 o'clock to 10 o'clock on weekdays, and the communication state becomes stable in the time zone of 18 o'clock to 22 o'clock on weekdays, is assumed. In this case, even when the communication state of the receiver 10 corresponds to the reception of a high bit rate in the time zone of 6 o'clock to 10 o'clock on weekdays, there are cases in which the receiver 10 becomes unable to respond to the reception of a high bit rate in accordance with degradation of the communication state formed thereafter. Thus, the criterion determining unit 22 generates a combination of a communication state representing a high communication speed and a reception form representing a bit rate of intermediate image quality, a combination of a communication state representing an intermediate communication speed and a reception form representing a bit rate of low image quality, and a combination of a communication state representing a low communication speed and a reception form representing a bit rate of low image quality and a large buffer size as criteria. On the other hand, in the time zone of 18 o'clock to 22 o'clock on weekdays, in a case in which the communication state of the receiver 10 corresponds to the reception of a high bit rate, it is assumed that the communication state continues to correspond to the reception of a high bit rate also after that. Thus, as one example, the criterion determining unit 22 generates a combination of a communication state representing a high communication speed and a reception form representing a bit rate of high image quality, a combination of a communication state representing an intermediate communication speed and a reception form representing a bit rate of intermediate image quality, and a combination of a communication state representing a low communication speed and a reception form representing a bit rate of low image quality as criteria.

The distribution unit 23 transmits the patterns and the criteria to the receiver 10. The reception control unit 12 of the receiver 10 stores the patterns and the criteria that have been received and determines a reception form on the basis of the pattern and the criteria. In this embodiment, the reception control unit 12 acquires each piece of data acquired by the data acquiring unit 11. The reception control unit 12 selects a pattern that coincides the most with an environment in which the receiver 10 is placed from among the stored patterns on the basis of the position information, the time information, and the communication environment information that have been acquired. The reception control unit 12 determines a reception form (a bit rate and a buffer size) corresponding to the acquired communication state (the communication speed) on the basis of the criteria corresponding to the selected pattern. The reception control unit 12 can transmit a distribution request including parameters relating to the reception form and the like to the content distributing server 3.

According to such an embodiment, after the receiver 10 receives the patterns and the criteria from the communication quality adjusting server 20, an optimal reception form can be determined only using the receiver 10. For this reason, a processing load on the communication quality adjusting server 20 side can be reduced.

Third Embodiment

A content distributing system according to this embodiment predicts a change in the environment of a receiver, which is different from the content distributing system according to the first embodiment. Hereinafter, points different from those of the first embodiment will be mainly described, the same reference signs will be assigned to the same elements, and detailed description will be omitted.

Figure 4:
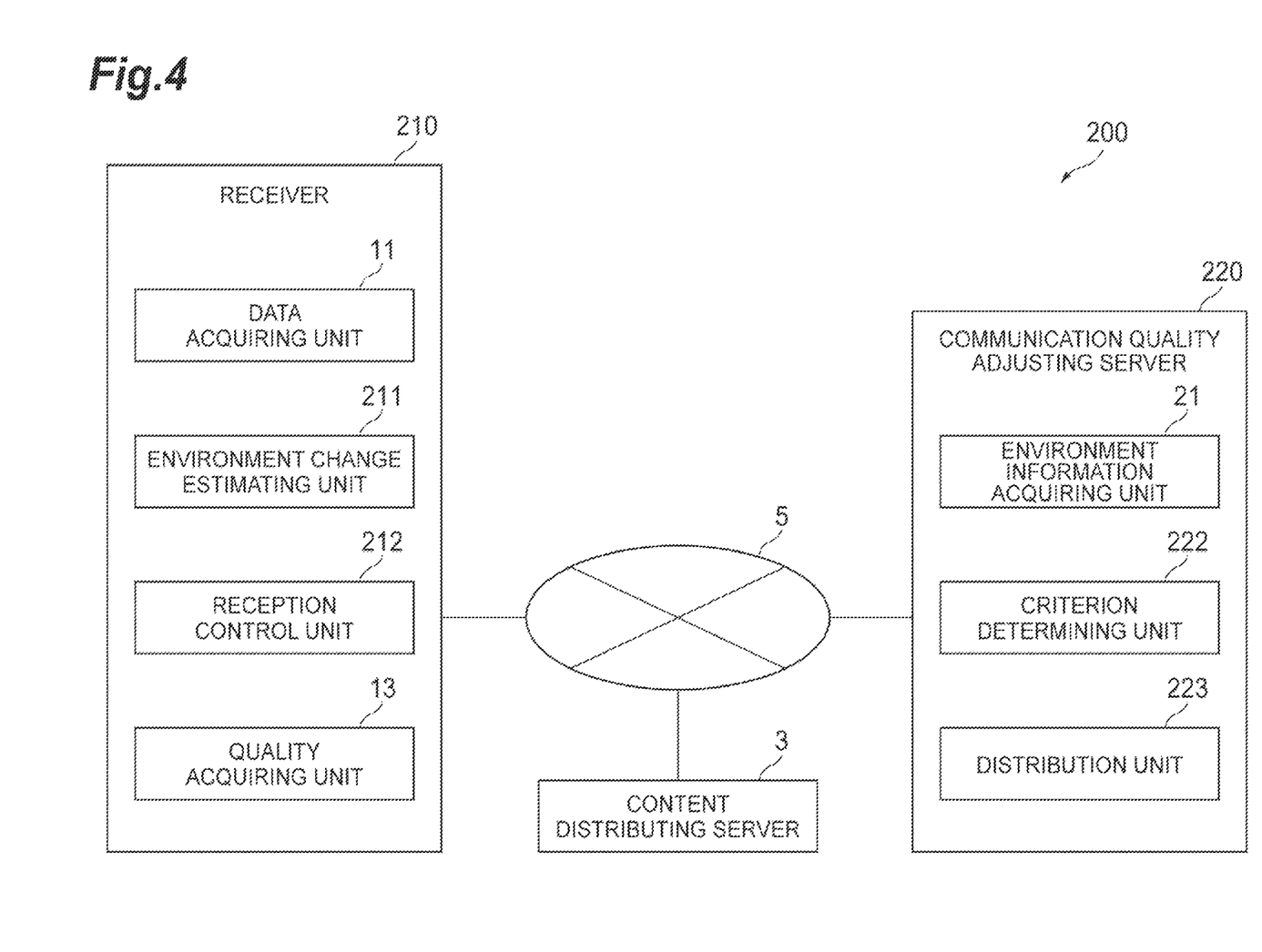
FIG. 4 is a conceptual diagram illustrating a content distributing system including a communication quality adjusting system according to another embodiment.

As illustrated in FIG. 4, a content distributing system 200 includes a content distributing server 3, a receiver 210, and a communication quality adjusting server 220. The receiver 210 includes a data acquiring unit 11, an environment change estimating unit 211, a reception control unit 212, and a quality acquiring unit 13. The communication quality adjusting server 220 includes an environment information acquiring unit 21, a criterion determining unit 222, and a distribution unit 223.

The environment change estimating unit 211 estimates a change in the communication environment on the basis of data accumulated in the past and current data that is acquired over time by the data acquiring unit 11. As the data accumulated in the past, data accumulated by the data acquiring unit 11 or data accumulated by the environment information acquiring unit 21 can be used. In a case in which the environment change estimating unit 211 acquires data accumulated in the past from the environment information acquiring unit 21, not only data relating to its own terminal but also data accumulated by the other receivers may be acquired together.

For example, the environment change estimating unit 211 estimates a movement speed and a movement route on the basis of a history of acceleration information, position information, and the like and estimates a movement destination of the receiver 210. In this case, a known behavior estimation technology may be used. The environment change estimating unit 211 estimates a communication environment at a movement destination on the basis of position information of the estimated movement destination and communication environment information accumulated in relation to the position information. In this case, a degree of easiness in a change in the communication speed during movement may be estimated by estimating the movement speed of the receiver 210. In addition, by predicting switching between base stations to which the receiver 210 is connected on the basis of the position information of the predicted movement destination, a change in the communication environment accompanied therewith may be predicted. In addition, for example, in a case in which the receiver 210 is not moving, the environment change estimating unit 211 may estimate a communication environment after elapse of a predetermined time at the current position of the receiver 210. Environment information after a change estimated by the environment change estimating unit 211 is transmitted to the communication quality adjusting server 220.

The criterion determining unit 222 determines a criterion associating a communication state of the receiver 210 with a reception form used when the receiver receives video content in accordance with the environment information acquired by the data acquiring unit 11. In addition, the criterion determining unit 222 determines a criterion associating a communication state after change with a reception form in accordance with the environment information after change transmitted from the environment change estimating unit 211.

The distribution unit 223 distributes information including a reception form to the receiver 210 on the basis of the criterion determined by the criterion determining unit 222 such that the receiver 210 receives video content in the reception form corresponding to the communication state of the receiver 210. In addition, the distribution unit 223 distributes information including the reception form determined in accordance with the environment information after change to the receiver.

The reception control unit 212 of the receiver 210 controls parameters relating to the reception form of data at the time of receiving video content before the change in the environment of the receiver 210 such that the receiver 210 receives the video content in a reception form corresponding to the environment information after a predicted change. For example, in a case in which degradation of the environment communication is estimated by the environment change estimating unit 211, the reception control unit 212 can perform increasing of the buffer size, changing of the bit rate, and the like such that video content can be reproduced continuously before and after a change in the communication environment. In addition, in a case in which communication with a network is predicted to be disconnected over a long time, the reception control unit 212 may store content of a low bit rate. In addition, in a case in which reproduction is predicted to stop, the reception control unit 212 may control display of the display such that a guide "The communication environment is bad. Please wait for a moment" is displayed.

As described above, in this embodiment, a change in the environment in which the receiver 210 is placed is predicted, and environment information in the environment after the predicted change is acquired. By responding to a change in the communication environment in advance, interruption of reproduction of video content that a user is viewing is inhibited.

In addition, the reception control unit 212 may acquire genre information of video content that a user is viewing and determine a reception form in correspondence with the genre information. For example, in a case in which the genre of video content is live broadcasting, the reception control unit 212 may set the buffer size to be small from a viewpoint of decreasing a time lag. In addition, in a case in which the genre of video content is sports, the reception control unit 212 may set the buffer size to be large together with setting the bit rate to be high such that a player in the video can be easily recognized.

As above, although the embodiments of the present invention have been described in detail with reference to the drawings, a specific configuration is not limited to the embodiments described above. For example, although an example in which the receiver is a mobile terminal performing radio communication or the like has been illustrated, the receiver is not limited thereto. For example, the receiver may be a stationary-type terminal such as a set-top box. In such a case, the data acquiring unit of the receiver may acquire a type of line connected to the receiver as environment information. In addition, the data acquiring unit may acquire information indicating whether a place in which the receiver is installed is an apartment house or a detached house as environment information. The criterion determining unit can derive an algorithm for acquiring an optimal combination of a communication state and a reception form through machine learning on the basis of environment information or the like in which a line type and the like are included.

In addition, although an example in which a criterion associating a communication state of the receiver with a reception form used when the receiver receives content is determined by the communication quality adjusting server has been illustrated, the determination is not limited thereto. For example, the receiver may have a function similar to that of the criterion determining unit, and criteria may be determined (generated) by the receiver.

Each block diagram used for description of the embodiment described above illustrates blocks in units of functions. Such functional blocks (component units) are realized by an arbitrary combination of at least one of hardware and software. In addition, a method for realizing each functional block is not particularly limited. In other words, each functional block may be realized by one device that is combined physically or logically or a plurality of devices by directly or indirectly (for example, using a wire, wirelessly, or the like) connecting two or more devices separated physically or logically. A functional block may be realized by combining software with one device or a plurality of devices described above.

As functions, there are determining, judging, calculating, computing, processing, deriving, investigating, looking up, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but the functions are not limited thereto. For example, a functional block (component unit) realizing a function of transmitting is referred to as a transmitting unit or a transmitter. As described above, methods of realizing all the functions are not particularly limited.

Figure 5:
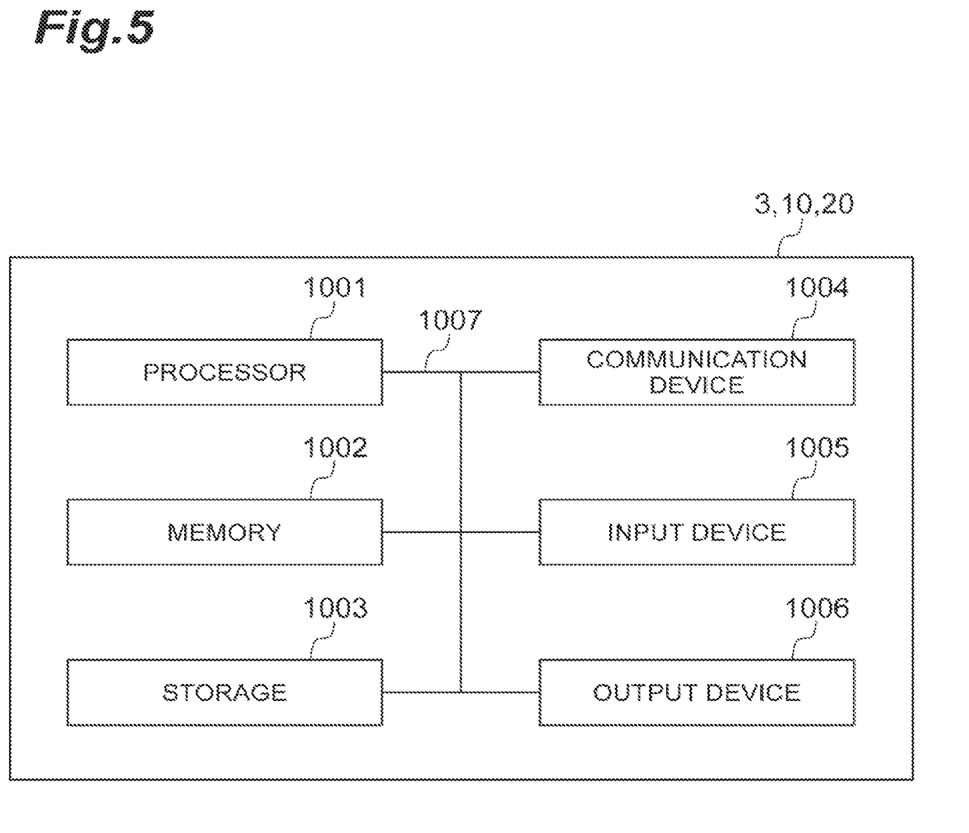
FIG. 5 is a diagram illustrating the hardware configuration of a content distributing server, a receiver, and a communication quality adjusting server.

For example, the content distributing server 3, the receiver 10, and the communication quality adjusting server 20 according to one embodiment of the present disclosure may function as a computer that performs the process of the method of the present disclosure. FIG. 5 is a diagram illustrating one example of the hardware configuration of the content distributing server 3, the receiver 10, and the communication quality adjusting server 20 according to one embodiment of the present disclosure. The content distributing server 3, the receiver 10, and the communication quality adjusting server 20 described above may be physically configured as a computer device including a processor 1001, a memory 1002, a storage 1003, a communication device 1004, an input device 1005, an output device 1006, a bus 1007, and the like.

In addition, in the following description, a term "device" may be rephrased with a circuit, a device, a unit, or the like. The hardware configuration of the content distributing server 3, the receiver 10, and the communication quality adjusting server 20 may be configured to include one or a plurality of devices illustrated in the drawing and may be configured without including some devices.

Each of the functions of the content distributing server 3, the receiver 10, and the communication quality adjusting server 20 is realized as the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each of the functional units of the content distributing server 3, the receiver 10, and the communication quality adjusting server 20 may be realized by the processor 1001.

In addition, the processor 1001 reads a program (a program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each of the functional units of the content distributing server 3, the receiver 10, and the communication quality adjusting server 20 may be realized by a control program that is stored in the memory 1002 and operated by the processor 1001. Although the various processes described above have been described to be executed by one processor 1001, the processes may be executed simultaneously or sequentially by two or more processors 1001. The processor 1001 may be mounted using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing a method according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including at least one of the memory 1002 and the storage 1003, a server, or any other appropriate medium.

The communication device 1004 is hardware (a transmission/reception device) for performing inter-computer communication through at least one of a wired network and a wireless network and, for example, may be called also as a network device, a network controller, a network card, a communication module, or the like. The communication device 1004, for example, may be configured to include a high frequency switch, a duplexer, a filter, a frequency synthesizer, or the like for realizing at least one of frequency division duplex (FDD) and time division duplex (TDD). For example, each of the functional units of the content distributing server 3, the receiver 10, and the communication quality adjusting server 20 described above may be realized by the communication device 1004.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the content distributing server 3, the receiver 10, and the communication quality adjusting server 20 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

Notification of information is not limited to an aspect/embodiment described in the present disclosure and may be performed using a difference method. For example, the notification of information may be performed using physical layer signaling (for example, downlink control information (DCI and uplink control information (UCI)), upper layer signaling (for example, radio resource control (RRC) signaling, medium access control (MAC) signaling, a master information block (MIB), a system information block (SIB)), any other signal, or a combination thereof. In addition, the RRC signaling may be referred to as an RRC message and, for example, may be an RRC connection setup message, an RRC connection reconfiguration message, or the like.

Each aspect/embodiment described in the present disclosure may be applied to at least one of systems using long term evolution (LTE), LTE-Advanced (LTE-A), Super 3G, IMT-advanced, a 4th generation mobile communication system (4G), a 5th generation mobile communication system (5G), Future Ratio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-Wideband (UWB), Bluetooth (registered trademark) and other appropriate systems and a next generation system extended based on these. In addition, a plurality of systems may be applied by being combined (for example, a combination of at least one of LTE and LTE-A and 5G or the like).

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

In the present disclosure, a specific operation performed by a base station may be performed by an upper node thereof depending on the situation. In a network configured by one or a plurality of network nodes having a base station, it is apparent that various operations performed for communicating with a terminal may be performed by at least one of the base station and network nodes other than the base station (for example, an MME, an S-GW, and the like may be considered but is not limited thereto). In the description presented above, although a case in which there is one network node other than the base station has been illustrated as an example, the other network node may be a combination of a plurality of other network nodes (for example, the MME and the S-GW).

Information and the like may be output from an upper layer (or a lower layer) to a lower layer (or an upper layer). The information and the like may be input and output through a plurality of network nodes.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be performed as a modified or changed form without departing from the concept and the scope of the present disclosure set in accordance with the claims. Thus, the description presented in the present disclosure is for the purpose of exemplary description and does not have any limited meaning for the present disclosure.

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology such as a coaxial cable, an optical fiber cable, a twisted pair, a digital subscriber line (DSL) or the like and a radio technology such as infrared rays, radio waves, microwaves, or the like, at least one of such a wiring technology and a radio technology is included in the definition of the transmission medium.

Information, a signal, and the like described in the present disclosure may be represented using any one among other various technologies. For example, data, an instruction, a command, information, a signal, a bit, a symbol, a chip, and the like described over the entire description presented above may be represented using a voltage, a current, radio-waves, a magnetic field or magnetic particles, an optical field or photons, or an arbitrary combination thereof.

In addition, a term described in the present disclosure and a term that is necessary for understanding the present disclosure may be substituted with terms having the same meaning or a meaning similar thereto. For example, at least one of a channel and a symbol may be a signal (signaling). For example, a signal may be a message. In addition, a component carrier (CC) may be referred to as a carrier frequency, a cell, a frequency carrier, or the like.

Terms such as "system" and "network" used in the present disclosure are interchangeably used.

In addition, information, a parameter, and the like described in the present disclosure may be represented using absolute values, relative values from predetermined values, or other corresponding information. For example, a radio resource may be indicated using an index.

A name used for each parameter described above is not limited in any aspect. In addition, numerical equations using such parameters may be different from those that are explicitly disclosed in this specification. Various channels (for example, a PDCCH, a PDCCH, and the like) and information elements can be identified using all the preferred names, and various names assigned to such various channels and information elements are not limited in any aspect.

In the present disclosure, Willis such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be interchangeably used. The base station may be also referred to as a macro cell, a small cell, a femtocell, a picocell, or the like.

The base station can house one or a plurality of (for example, three) cells. In a case in which the base station houses a plurality of cells, the entire coverage area of the base station can be partitioned into a plurality of smaller areas, and, for each of the smaller areas, a communication service may be provided using a base station subsystem (for example, an indoor small base station (a remote radio head (RRH)). A term such as "cell" or "sector" represents a part or the whole of a coverage area of at least one of a base station and a base station subsystem providing a communication service for this coverage.

In the present disclosure, terms such as "mobile station (MS)", "user terminal", "user equipment (UE)", "terminal", and the like can be interchangeably used.

A mobile station may be called as a subscriber station, a mobile unit, a subscriber unit, a wireless unit, a remote unit, a mobile device, a wireless device, a wireless communication device, a remote device, a mobile subscriber station, an access terminal, a wireless terminal, a radio terminal, a remote terminal, a hand set, a user agent, a mobile client, a client, or any other appropriate term by persons skilled in the art.

At least one of a base station and a mobile station may be referred to as a transmission device, a reception device, a communication device, or the like. In addition, at least one of a base station and a mobile station may be a device mounted in a moving body, a moving body, or the like. The moving body may be a vehicle (for example, a car, an airplane, or the like), a moving body moving in an unmanned manner (for example, drone, an automated driving vehicle, or the like), or a robot (a manned type or an unmanned type). In addition, at least one of a base station and a mobile station includes a device that does not necessarily move at the time of a communication operation. For example, at least one of a base station and a mobile station may be an Internet of things (IOT) device such as a sensor or the like.

In addition, a base station in the present disclosure may be rephrased by a user terminal. For example, each aspect/embodiment of the present disclosure may be applied to a configuration acquired by replacing communication between a base station and a user terminal with communication among a plurality of user terminals (for example, may be referred to as Device-to-Device (D2D), Vehicle-to-Everything (V2X), or the like) or the like. In addition, a term such as "up", "down", or the like may be rephrased with a term corresponding to inter-terminal communication (for example, "side"). For example, an uplink channel, a downlink channel, or the like may be rephrased with a side channel.

Terms such as "determining" used in the present disclosure may include various operations of various types. The "determining," for example, may include a case in which judging, calculating, computing, processing, deriving, investigating, looking up, search, or inquiry (for example, looking up a table, a database, or any other data structure), or ascertaining is regarded as "determining." In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining." In other words, "determining" includes a case in which a certain operation is regarded as "determining." In addition, "determining" may be rephrased with "assuming," "expecting," "considering," or the like.

Terms such as "connected" or "coupled" or all the modifications thereof mean all the kinds of direct or indirect connection or coupling between two or more elements and may include presence of one or more intermediate elements between two elements that are mutually "connected" or "coupled." Coupling or connection between elements may be physical coupling or connection, logical coupling or connection, or a combination thereof. For example, "connection" may be rephrased with "access." When used in the present disclosure, two elements may be considered as being mutually "connected" or "coupled" by using at least one of one or more wires, cables, and print electric connections and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in the present disclosure does not mean "only on the basis of" unless otherwise mentioned. In other words, description of "on the basis of" means both "only on the basis of" and "at least on the basis of."

In the present disclosure, in a case in which names such as "first," "second," and the like is used, referring to each element does not generally limit the amount or the order of such an element. Such names may be used in the present disclosure as a convenient way for distinguishing two or more elements from each other. Accordingly, referring to the first and second elements does not mean that only the two elements are employed therein or the first element should precede the second element in a certain form.

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, in a case in which an article such as "a," "an," or "the" in English is added through a translation, the present disclosure may include a plural form of a noun following such an article.

In the present disclosure, an expression "A and B are different" may mean that "A and B are different from each other." In addition, the expression may mean that "A and B are different from C." Terms such as "separated," "coupled," and the like may be interpreted to be similar to being "different."

REFERENCE SIGNS LIST

10 receiver
20 communication quality adjusting server
21 environment information acquiring unit
22 criterion determining unit
23 distribution unit

The invention claimed is:

1. A communication quality adjusting system comprising circuitry configured to:
   acquire environment information representing an environment, in which a receiver is placed, and having an effect on a communication state of the receiver, the communication state being a communication quality when the receiver is receiving content;
   determine a criterion associating a communication state of the receiver and a reception form which is separate from the communication state and defines parameters, including at least one of a buffer size and a bit rate, used when the receiver receives content in accordance with the environment information; and
   perform control such that the receiver receives the content using the parameters used in the reception form corresponding to the communication state of the receiver on the basis of the criterion,
   wherein the environment information includes position information representing a position of the receiver, time information representing a time at which the receiver performs communication, and a network speed setting of the receiver in which the network speed is set in a plurality of communication levels in accordance with a radio wave intensity from a base station.

2. The communication quality adjusting system according to claim 1, wherein, the circuitry performs machine learning of a combination of the communication state corresponding to the environment information and the reception form such that reproduction quality of the content received is maximized.

3. The communication quality adjusting system according to claim 1,
wherein the circuitry generates a plurality of criteria corresponding to mutually different pieces of the environment information, and
wherein the circuitry distributes the plurality of criteria to the receiver as information including the reception form.

4. The communication quality adjusting system according to claim 1,
wherein the circuitry predicts a change in the environment in which the receiver is placed and acquires the environment information in the environment after the predicted change,
wherein the circuitry determines the criterion associating the communication state of the receiver and the reception form used when the receiver receives the content in accordance with the environment information after the predicted change, and
wherein the circuitry performs control such that the receiver receives the content in the reception form corresponding to the environment information after the predicted change before the change in the environment of the receiver.

5. A method, implemented by a communication quality adjusting system, comprising:

acquiring, by circuitry of the communication quality adjusting system, environment information representing an environment, in which a receiver is placed, and having an effect on a communication state of the receiver, the communication state being a communication quality when the receiver is receiving content;

determining, by the circuitry a criterion associating a communication state of the receiver and a reception form which is separate from the communication state and defines parameters, including at least one of a buffer size and a bit rate, used when the receiver receives content in accordance with the environment information; and performing, by the circuitry, control such that the receiver receives the content using the parameters used in the reception form corresponding to the communication state of the receiver on the basis of the criterion, wherein the environment information includes position information representing a position of the receiver, time information representing a time at which the receiver performs communication, and a network speed setting of the receiver in which the network speed is set in a plurality of communication levels in accordance with a radio wave intensity from a base station.

* * * * *